(12) United States Patent
Liao

(10) Patent No.: US 6,360,999 B1
(45) Date of Patent: Mar. 26, 2002

(54) LED INDICATOR RETAINING DEVICE

(75) Inventor: Nien Chiang Liao, Lu-Chou (TW)

(73) Assignee: Hon Hai Precision IND Co., Ltd., Taipei Hsien (TW)

( * ) Notice: Subject to any disclaimer, the term of this patent is extended or adjusted under 35 U.S.C. 154(b) by 0 days.

(21) Appl. No.: 09/437,286

(22) Filed: Nov. 10, 1999

(30) Foreign Application Priority Data

Apr. 13, 1999 (TW) .......................................... 88205657

(51) Int. Cl.[7] ................................................. G12B 9/00
(52) U.S. Cl. ....................... 248/27.1; 248/27.3; 24/545; 24/563
(58) Field of Search ............................... 248/27.3, 27.1; 24/545, 563; 411/525, 526, 529, 516, 512

(56) References Cited

U.S. PATENT DOCUMENTS

| | | | | |
|---|---|---|---|---|
| 1,882,306 A | * | 10/1932 | Tinnerman | 403/21 |
| 2,260,048 A | * | 10/1941 | Newell | 411/552 |
| 2,347,863 A | * | 5/1944 | Woodward | 24/292 |
| 3,084,962 A | * | 4/1963 | Feuerbacher | 248/27.3 |
| 3,170,213 A | * | 2/1965 | Thomas, Jr. | 24/571 |
| 4,447,106 A | * | 5/1984 | Houtz et al. | 439/544 |
| 4,699,278 A | * | 10/1987 | Klein | 211/57.1 |
| 4,813,885 A | * | 3/1989 | Colleran et al. | 439/565 |
| 5,243,153 A | * | 9/1993 | Holwerda | 181/208 |
| 5,794,394 A | * | 8/1998 | Bill et al. | 52/295 |

* cited by examiner

*Primary Examiner*—Leslie A. Braun
*Assistant Examiner*—Naschica S. Morrison
(74) *Attorney, Agent, or Firm*—Wei Te Chung

(57) ABSTRACT

A device for retaining an LED indicator on a computer enclosure includes a hole defined in a panel of the enclosure for receiving the LED indicator therein. The hole has a circumferential edge along which a perpendicular flange is formed for surface contacting and thus securely retaining the LED indicator. Two radially extending slits are defined in the panel in communication with the hole thereby forming a resilient tab therebetween. A nominal diameter of the hole is substantially corresponding to or slightly smaller than a diameter of the LED indicator whereby when the LED indicator is inserted into the hole, the resilient tab is deflected and thus applies a biasing force to the LED indicator for securely retaining the LED indicator. A round corner is formed between the flange and the edge of the hole for avoiding damaging the LED indicator and for guiding the LED indicator into the hole.

8 Claims, 7 Drawing Sheets

LED INDICATOR RETAINING DEVICE

BACKGROUND OF THE INVENTION

1. Field of the Invention

The present invention generally relates to a device for retaining an electronic device on a casing, and in particular to a device for directly mounting a light emitting diode (LED) indicator to a computer enclosure which effectively prevents the LED indicator from being damaged by sharp edges of the enclosure.

2. The Prior Art

The rapid development of electronics requires an increasing number of electronic devices to be retained in a single casing or enclosure. Among the electronic devices, indicators are the ones that are frequently fixed to the casing directly. The most commonly used indicators are LED-based indicators. An example of a conventional way for mounting an LED indicator to an enclosure is shown in FIG. 1 of the attached drawings. A retainer 11 defines a central bore 12 into which an LED 17 is tightly fit. The retainer 11 is in turn fit in a hole 15 defined in an enclosure 13. The retainer 11 forms barbs 14 that engage with an edge of the hole 15 for securely fixing the retainer 11 in the hole 15. The use of retainer 11 increases additional steps in the assembly process and also increases costs.

FIGS. 2 and 3 show another example of mounting an LED indicator 27 to an enclosure 25. A retainer comprises a conic portion 21 and a base 23 with a circumferential groove 22 defined therebetween. The conic portion 21 facilitates insertion of the retainer into a hole 26 defined in the enclosure 25 with an edge of the hole 26 received in the groove 22 thereby securely fixing the retainer to the enclosure 25. The LED 27 has conductors 29 inserted into and retained in holes 24 defined in the conic portion 21 for electrical connection with wires 20 extending into the retainer. The use of the retainer increases costs and complicates the assembly process.

It is thus desired to provide an LED indicator retaining device that overcomes the above problems.

SUMMARY OF THE INVENTION

Accordingly, an object of the present invention is to provide an LED indicator retaining device for directly mounting an LED indicator to an enclosure.

Another object of the present invention is to provide an LED indicator retaining device that effectively prevents sharp edges of an enclosure from damaging the LED indicator.

To achieve the above objects, an LED indicator retaining device in accordance with the present invention for retaining an LED indicator on a computer enclosure comprises a hole defined in a panel of the enclosure for receiving the LED indicator therein. The hole has a circumferential edge along which a perpendicular flange is formed for surface contacting and thus securely retaining the LED indicator. Two radially-extending slits are defined in the panel in communication with the hole thereby forming a resilient tab therebetween. A nominal diameter of the hole is substantially corresponding to or slightly smaller than a diameter of the LED indicator whereby when the LED indicator is inserted into the hole, the resilient tab is deflected and thus applies a biasing force to the LED indicator for securely retaining the LED indicator. A round corner is formed between the flange and the edge of the hole for avoiding damaging the LED indicator and for guiding the LED indicator into the hole.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
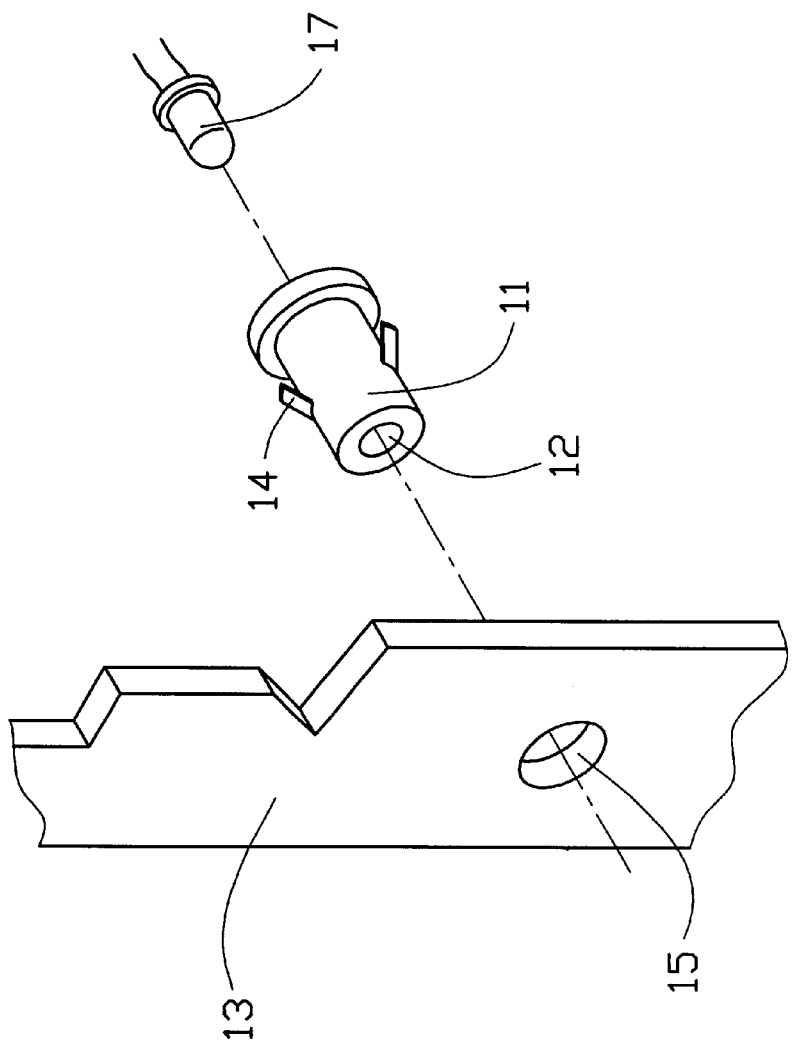
FIG. 1 is an exploded view of a conventional LED indicator retainer for mounting LED indicator to an enclosure.
Figure 2:
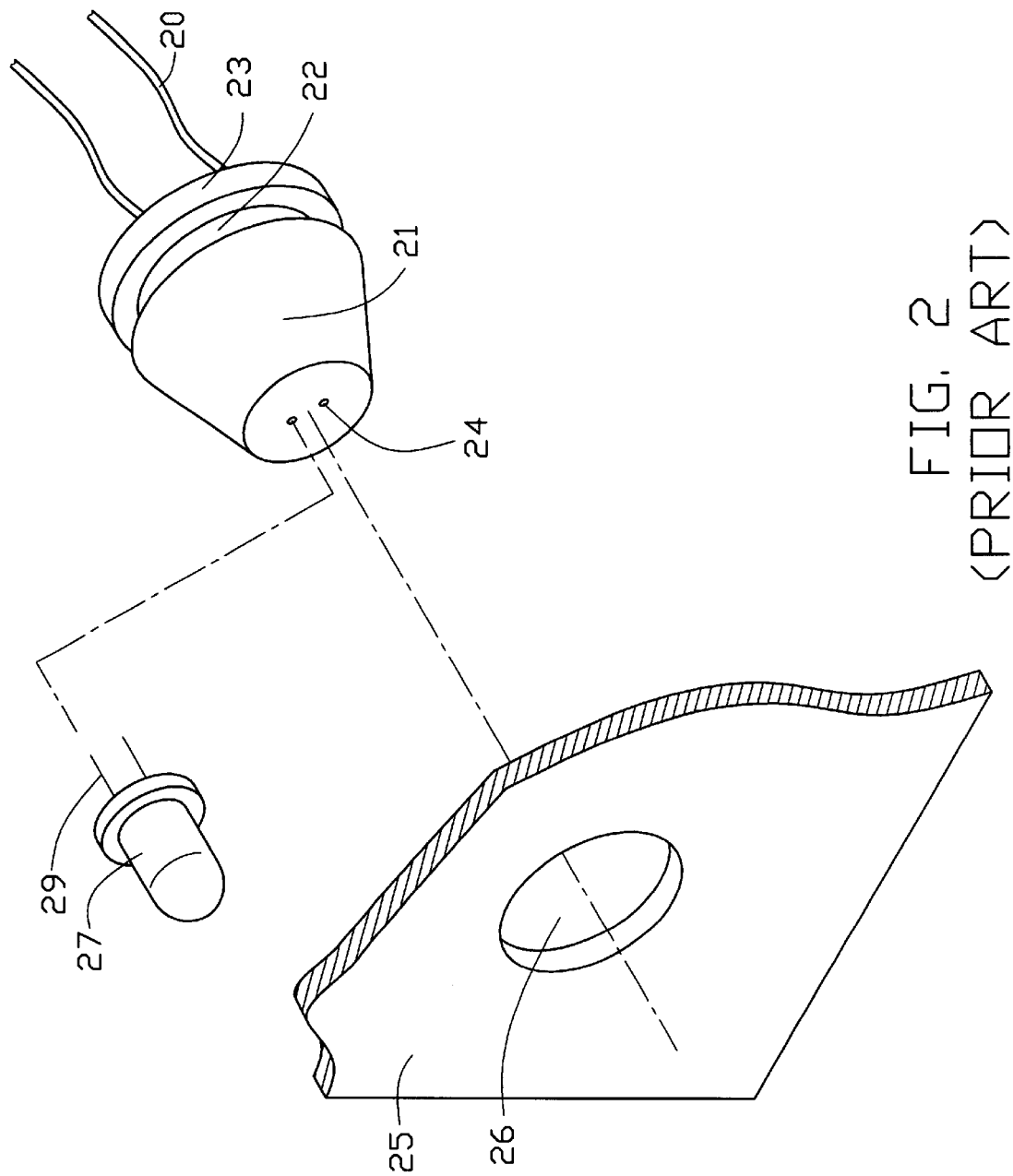
FIG. 2 is an exploded view of another conventional LED indicator retainer for mounting an LED indicator to an enclosure.
Figure 3:
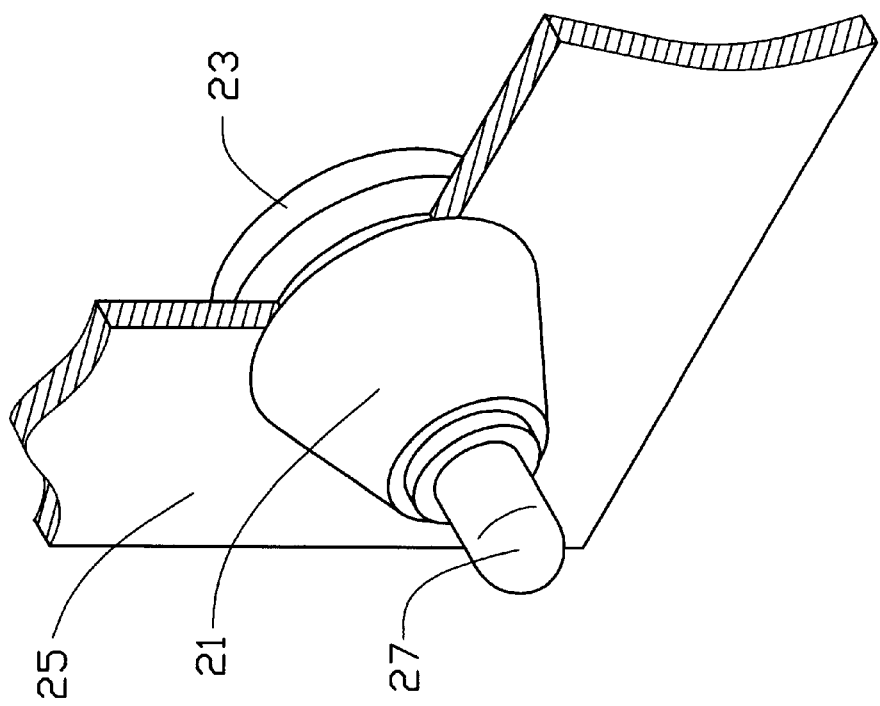
FIG. 3 is an assembled view of FIG. 2.
Figure 4:
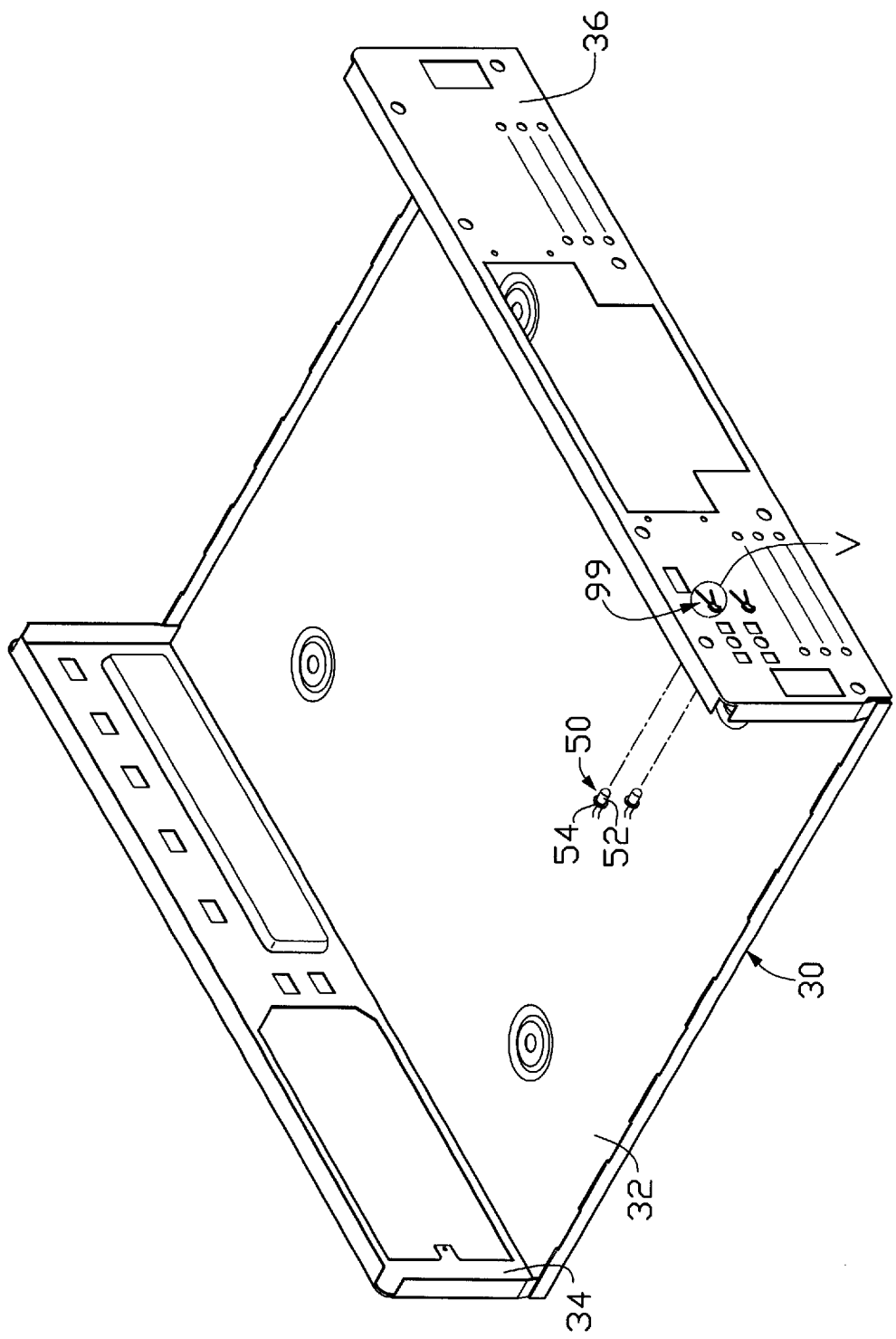
FIG. 4 is a perspective view of a computer enclosure in which LED indicator retaining devices in accordance with the present invention are formed for retaining LED indicators on the enclosure.

Referring to the drawings and in particular to FIG. 4, a computer enclosure designated by reference numeral 30 forms two LED indicator retaining devices 99 constructed in accordance with the present invention for receiving and retaining LEDs 50 on the enclosure 30. In the embodiment illustrated, the computer enclosure 30 comprises a bottom panel 32 and two side panels 34, 36 extending from opposite edges of the bottom panel 32. The LED indicator retaining devices 99 are formed on the side panel 36 for receiving two LEDs 50. Each LED 50 comprises a cylindrical body 52 with a circumferential flange 54 formed on one end thereof.

Figure 5:
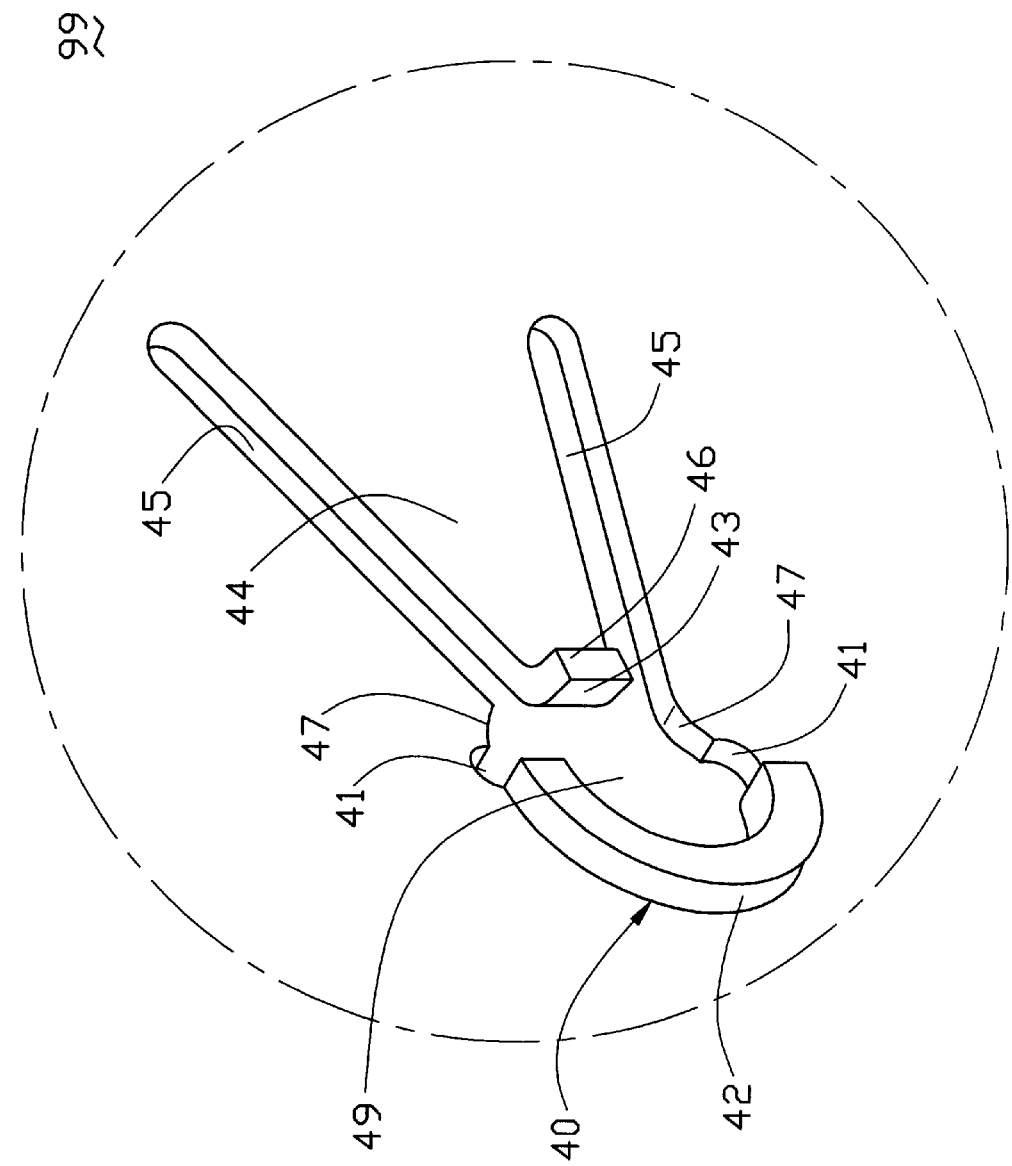
FIG. 5 is an enlarged view of encircled portion V of FIG. 4 showing the LED indicator retaining device of the present invention.
Figure 6:
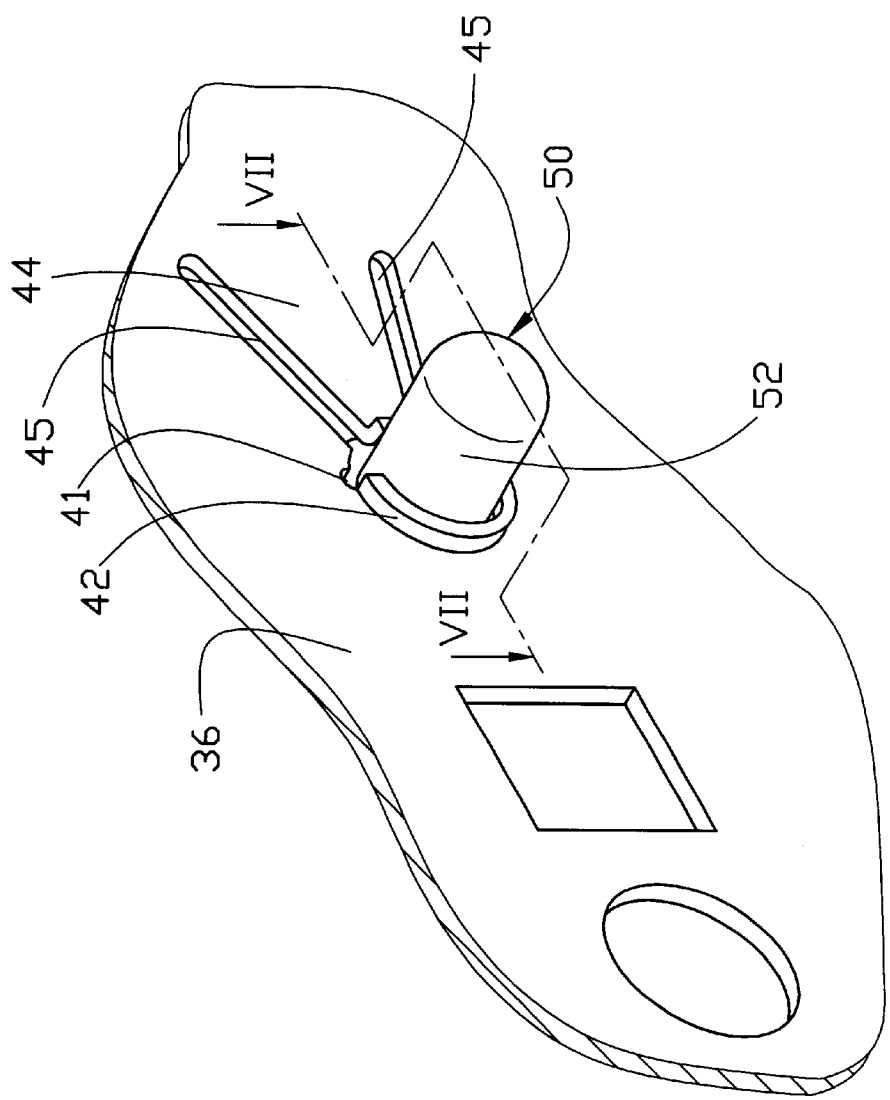
FIG. 6 is a perspective view showing an LED indicator retained in the enclosure by the LED indicator retaining device of the present invention.
Figure 7:
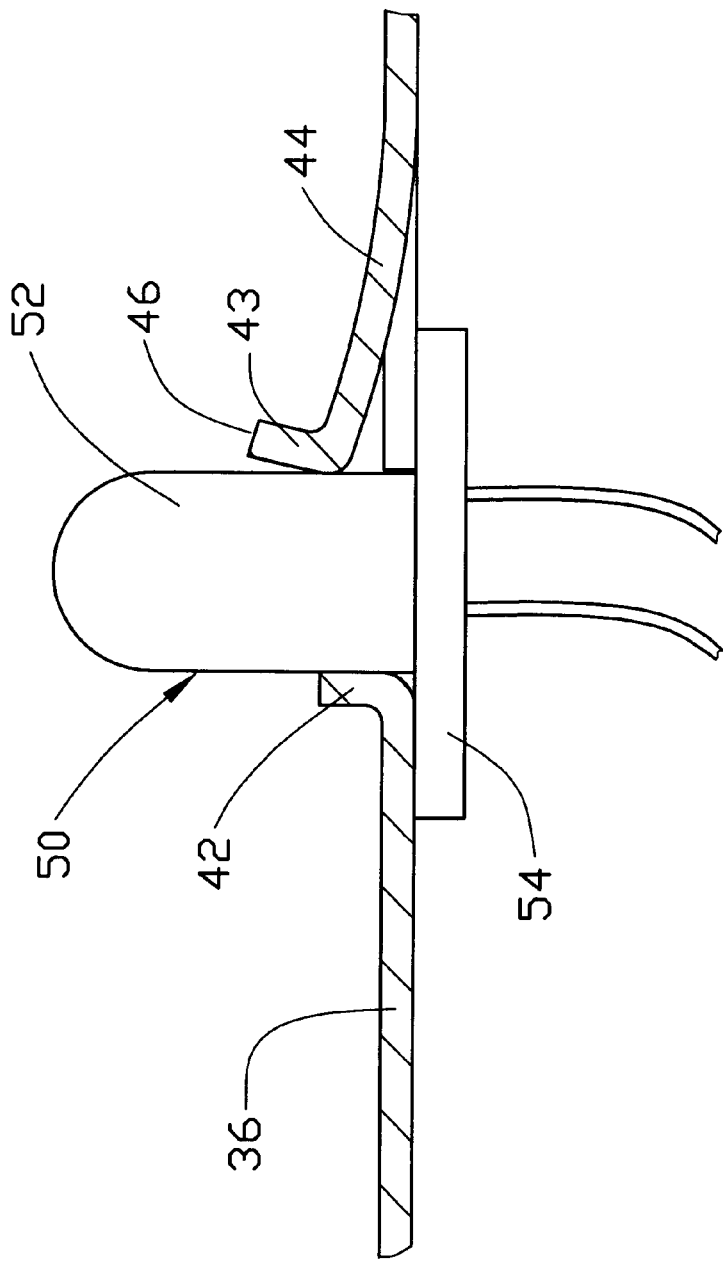
FIG. 7 is a cross-sectional view taken along line VII—VII of FIG. 6.

Also referring to FIGS. 5–7, the LED indicator retaining device 99 comprises a through hole 49 defined in the panel 36 of the enclosure 30 for receiving the cylindrical body 52 of the corresponding LED 50. The hole 49 has a circumferential edge 47. At least two slits 45 are defined in the panel 36 in communication with the hole 49 whereby a resilient tab 44 is formed therebetween with a free end 43 of the tab 44 forming a portion of the edge 47 of the hole 49. A perpendicular flange 46 is formed on the free end 43 of the tab 44. Preferably, the slits 45 extend radially from the hole 49.

Retaining means 40 is formed along the edge 47 of the hole 49 for securely retaining the LED 50 received in the hole 49. The retaining means 40 comprises an arc rib 42 extending along a portion of the edge 47 of the hole 49. Preferably, the arc rib 42 extends approximately 180 degrees and the arc rib 42 has a central portion substantially opposite to the free end 43 of the resilient tab 44 whereby when the LED 50 is received in the hole 49, the arc rib 42 and the flange 46 of the tab 44 engage with the body 52 of the LED 50 at opposite sides thereof for securely retaining the LED indicator 50. Preferably, the arc rib 42 is a bent flange of the edge 47 of the hole 49 as shown in FIG. 7 formed by stamping the panel 36.

To mount the LED 50 to the panel 36 of the enclosure 30, the cylindrical body 52 of the LED 50 is inserted into the hole 49. With a diametrical distance between rib 42 and the flange 46 (namely, a nominal diameter of the hole 49) substantially corresponding to or slightly smaller than diameter of the cylindrical body 52 of the LED 50, insertion of the cylindrical body 52 into the hole 49 in a direction consistent with the extending direction of the flange 46 and the rib 42 causes the resilient tab 44 to deflect as shown in FIG. 7. The deflection of the tab 44 applies a biasing force to the LED indicator 50 thereby securely retaining the LED 50 in the hole 49. The circumferential flange 54 of the LED 50 serves to abut against the panel 36 for retaining the LED 50 in position. However, it is not necessarily required.

Both the flange 46 and the rib 42 form round corners in the connection thereof with the panel 36 thereby effectively avoiding damaging the LED 50 when the LED 50 is inserted into the hole 49. The round corners also serve to guide the cylindrical body 52 into the hole 49. Furthermore, the rib 42 and the flange 46 of the resilient tab 44 provide an increased surface contact with the LED 50 thereby more securely retaining the LED 50 in the hole 49.

In the embodiment illustrated, portions of the edge 47 extend between the slits 45 and the arc rib 42. To avoid damaging the LED 50 by the portions of the edge 47, it is preferable to form the portions of the edge 47 with a larger diameter whereby no direct contact may occur between the portions of the edge 47 and the LED 50.

Preferably, the rib 42 and the resilient tab 44 are formed by stamping operation. To release stress caused by the stamping operation, notches 41 are preferably formed on the edge 47 of the hole 49.

Although the present invention has been described with reference to the preferred embodiment, it is apparent to those skilled in the art that a variety of modifications and changes may be made without departing from the scope of the present invention which is intended to be defined by the appended claims. For example, there may be two or more resilient tabs 44 surrounding the hole 49.

What is claimed is:

1. A device retaining an electronic element on a panel comprisinga hole defined in the panel having a circumferential edge, a first perpendicular flange formed along a portion of the circumferential edge of the hole, at least two elongated slits defined in the panel in communication with the hole and opposite to the first flange for forming a resilient tab therebetween, the tab having a free end forming a second perpendicular flange extending along another portion of the edge of the hole, the second flange adapted to contact the electronic element when the electronic element is inserted into the hole and wherein said first flange remains stationary with respect to said panel and wherein said second flange is adapted to be deflected from a plane of said panel and apply a biasing force to the electronic element for retaining the electronic element in the hole.

2. The device as claimed in claim 1, wherein a round corner is formed between the portion of the edge and the first flange for avoiding damaging the electronic element when the electronic element is inserted into the hole.

3. The device as claimed in claim 1, wherein a round corner is formed between the resilient tab and the second flange for avoiding damaging the electronic element when the electronic element is inserted into the hole.

4. The device as claimed in claim 1, wherein notches are formed on the edge between the slits and the portion of the edge of the hole opposite the free end of the resilient tab.

5. The device as claimed in claim 1, wherein the slits extend radially.

6. The device as claimed in claim 1, wherein the electronic element is an LED.

7. The device as claimed in claim 1, wherein the panel is a portion of a computer enclosure.

8. An LED retainer assembly comprising:
a panel comprising a front surface and an opposite back surface;
a device formed on the panel, and defining in said panel a through hole with a circumferential edge thereabouts;
stationary retaining means formed along one portion of said circumferential edge and; being stationary with respect to said panel
a resilient tab disposed beside said through hole, formed between two elongtaed slits and defining a movable free end extending along another portion of said circumferential edge opposite to said one portion; and
an LED comprising a body and a circumferential flange, said body extending through the through hole and the circumferential flange abutting against the back surface of the panel; wherein
said resilient tab is deflected forward out of the front surface of the panel, and one side of the body of the LED abuts against the stationary retaining means while the other side of the body of the LED is biased by the moveable free end of the resilient tab toward said retaining means.

* * * * *